United States Patent

[11] 3,612,092

| [72] | Inventor | Ralph D. Boone |
| | | 2920 Axtell, Clovis, N. Mex. 88101 |
| [21] | Appl. No. | 732,779 |
| [22] | Filed | May 28, 1968 |
| [45] | Patented | Oct. 12, 1971 |

[54] MUD PIPE MOVER
7 Claims, 7 Drawing Figs.

[52] U.S. Cl. ................................................. 137/344, 239/212
[51] Int. Cl. ................................................. B05b 9/02, E01h 3/02
[50] Field of Search ........................................ 239/212, 213, 177; 137/344

[56] References Cited
UNITED STATES PATENTS

| 3,353,751 | 11/1967 | Dowd | 137/344 X |
| 3,370,606 | 2/1968 | Kane | 137/344 |
| 3,379,378 | 4/1968 | Kern | 137/344 X |
| 3,394,729 | 7/1968 | Bower et al. | 137/344 |
| 3,417,766 | 12/1968 | Purtell | 137/344 X |
| 3,448,927 | 6/1969 | Blair | 137/344 X |
| 3,465,766 | 9/1969 | Siebert | 137/344 X |
| 2,931,579 | 4/1960 | Ruddell | 239/212 X |
| 3,314,608 | 4/1967 | Curtis et al. | 239/213 X |

*Primary Examiner*—Samuel Scott
*Attorney*—Charles W. Coffee

ABSTRACT: An irrigation pipe to be moved constantly as it waters is supported by a plurality of vehicles. The ground engaging element of each vehicle is an elongated cylinder having a helical vane thereon so that rotation of the cylinder moves the vehicle along the earth as by an auger. The cylinder is rotated by an encircling band similar to a capstan or brake band. Power is transmitted to each vehicle by a reciprocating cable. To support the pipe, a mast is mounted on each vehicle and guy wires extend from the mast to the pipe. To compensate for uneven ground, a spreader is mounted on the pipe between vehicles and stays extend over the spreader to the vehicles which prevents the pipe from substantially bending upward between vehicles.

INVENTOR:
RALPH D. BOONE

INVENTOR:
RALPH D. BOONE
BY:

3,612,092

MUD PIPE MOVER

CROSS-REFERENCE TO RELATED APPLICATIONS

This application is copending with an application made jointly by me and Rufus J. Purtell, Ser. No. 662,802, filed Aug. 23, 1967. However, no claim for priority is made at this time.

BACKGROUND OF THE INVENTION

1. Field of the Invention

This invention relates to agricultural irrigation and more particularly to a system for moving sprinkler pipe while water is being sprinkled therefrom.

2. Description of the Prior Art

Although agricultural irrigation has been known for centuries, sophisticated self-moving systems have been developed only recently. Zybach, U.S. Pat. No. 3,001,721, illustrates an irrigation system which is currently on the market. Zybach shows a source of water under pressure which flows to a pivot on the ground and through a sprinkler pipe, the pipe moving constantly in a rotating arc. Vehicles supporting the pipe have towers which have guy wires to support the pipe and the tops of the towers are connected by cables to compensate for uneven ground. Also midway between vehicles the pipe is supported by a truss-type arrangement including a truss rod and a depending flange.

Various type elements have been suggested for the ground engaging elements on the vehicles. Zybach uses steel wheels. In my previous U.S. Pat. No. 3,302,656, I have used runners with a pushing foot. Curtis, et al., in U.S. Pat. No. 3,314,608 illustrates a rubber pneumatic tire. Purtell U.S. Pat. No. 3,245,595 illustrates an interesting mud shucker arrangement to remove mud which would accumulate on a steel wheel. Purtell U.S. Pat. No. 3,281,081 illustrates a particular mud scraper for scraping the mud from a steel wheel. Woods U.S. Pat. No. 3,295,548 illustrates a "dishpan" which partially rotates as it is drug along the ground and is self-scouring.

SUMMARY OF THE INVENTION

A system according to this invention is primarily designed to sprinkle water from the pipe while the pipe is being moved. Also, it is primarily designed to have the pipe elevated above the ground and rotate as a rotating arc.

For a ground engaging element, each vehicle uses an elongated cylinder which rotates about its axis. The cylinder does not roll along the ground, but rotates in the mud. Therefore as the cylinder rotates in the mud, the mud is wiped off the metal rather than sticking as mud does on a rolling cylinder. The vehicle is advanced by helical vanes mounted on the cylinder so that in effect the vehicle is "augered" forward.

In this regard, the ground engaging element is something of a "mudder." I.e., it operates as well or better in a quagmire or muddy field than it does on dry ground. This is not true of most of the prior art.

As previously indicated, (with the Zybach patent), compensation must be made when a system is operated on uneven ground. Uneven ground causes certain bending in the pipe, and, also, the vehicles tend not to run in an upright position and tend to bend the pipe.

I solved the problem by preventing the pipe from rising between the vehicles. The pipe has a certain amount rigidity as it extends from one vehicle to the next. Therefore, if the pipe dips down on one side or if the mast leans to the right or left, the pipe must raise up on one side of the vehicle. Therefore, if the pipe is prevented from rising, it will not dip down on the other side or the tops of the masts will not lean excessively to the right or the left. However, since some flexibility must be in the pipe to go over hills, certain springs are included in this portion of the system.

An object of this invention is to irrigate agricultural fields.

Other objects are to achieve the above with a device that is lightweight, sturdy, compact, durable, simple, safe, versatile, efficient and reliable, yet inexpensive and easy to manufacture, erect, operate, and maintain.

Further objects are to achieve to above with a method that is safe, rapid, and inexpensive, and does not require skilled people to erect, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENTS

Figure 1:
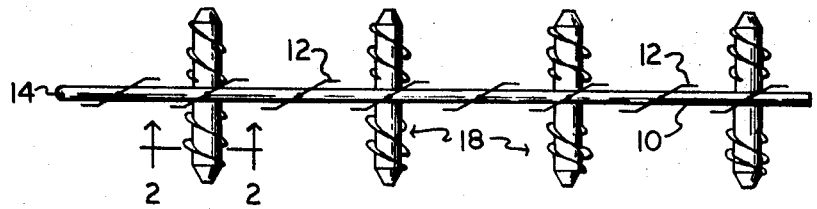
FIG. 1 is a plan representation schematically showing a system according to this invention.
Figure 2:
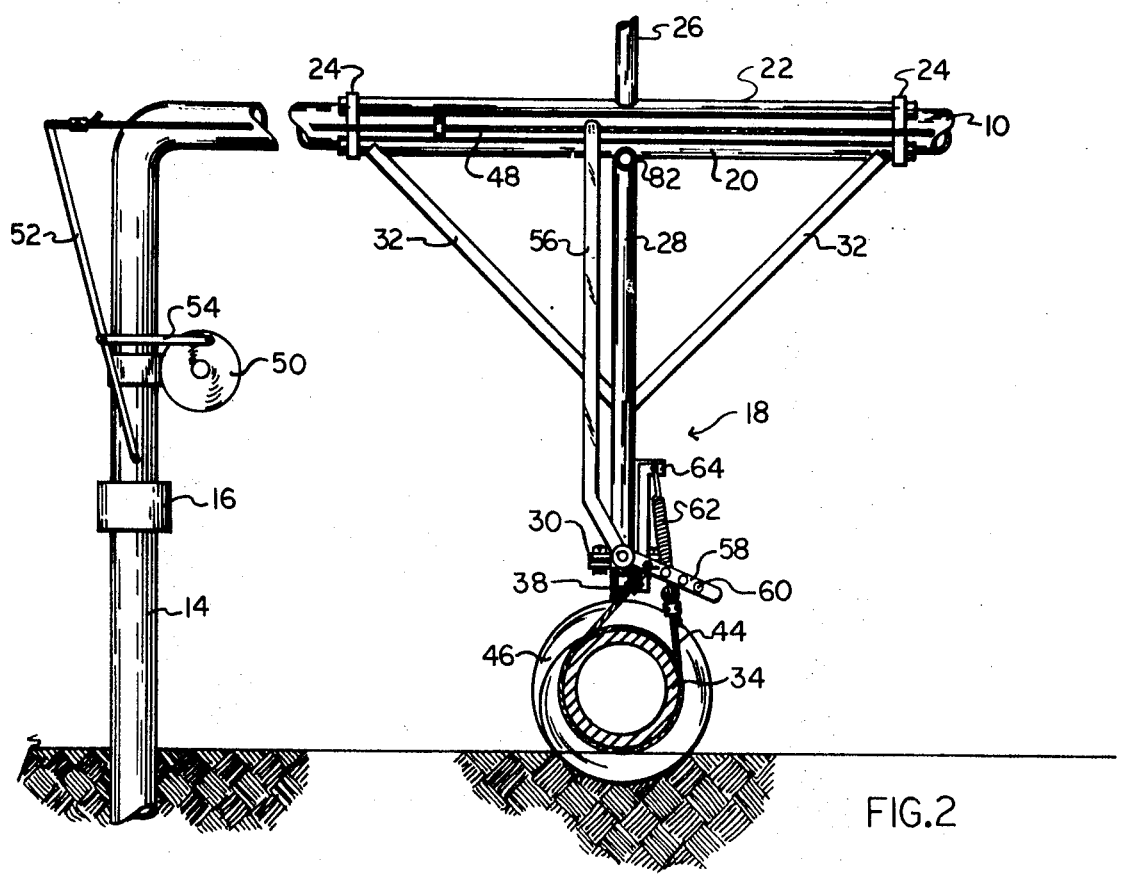
FIG. 2 is a sectional view showing one vehicle taken substantially on line 2—2 of FIG. 1.

One embodiment of a system according to this invention includes horizontal elongated pipe 10 which carries water under pressure to a plurality of sprinklers 12 for sprinkling water upon the ground to be watered (FIG. 1). The pipe is supplied with water from a source of water under pressure and such sources are well known to the art. It has been illustrated as an underground system terminating with vertical pipe 14 which forms a pivot for the system to rotate about; the swivel or rotating joint 16 permitting said rotation (FIG. 2).

The pipe 10 is movingly supported by a plurality of vehicles 18. Each vehicle 18 includes saddle 20 upon which the pipe 10 rests. Upper saddle 22 fits above the pipe and the pipe is clamped between saddles 20 and 22 by bands 24. Mast 26 is attached to upper saddle 22 to support the guy wires as described later. Stanchion 28 extends downward from the saddle 20 to turntable 30. Braces 32 extend from about the middle of the stanchion 28 to the saddle 20 near the ends to hold the pipe 10 and the stanchion 28 in proper relationship.

Elongated horizontal cylindrical ground engaging element 34 is journaled at each end into ears 36 which are attached to beam 38. The beam is attached at its center to the bottom of the turntable 30. The beam 38 and ears 36 form a bracket for the element 34. The cylindrical ground engaging element 34 is journaled to the ears 36 by use of bolts 40 extending from the ground engaging element 34 through the ears 36. Those with ordinary skill in the irrigation arts will understand how to journal cylindrical rotating elements 34 to rotate about its axis to the stationary ears 36 and to provide bearings as necessary. The element 36 is cone shaped on each end 42. The middle of element 34 has uninterrupted cylindrical surface for the operation of driving band 44. Helical vanes 46 are attached to the element 34 on each side of the middle. The helical vanes 46 are attached as by welding to the cylindrical element 34 and also extend around the conic ends 42. The element 34 with the vanes is quite similar to an auger.

Reciprocating power cable 48 is used to transmit power to each vehicle 18. The power cable 48 extends along the pipe 10 from the vertical supply pipe 14 to the end vehicle. Motor driven wheel 50 is journaled for rotation to the upper portion of vertical supply pipe 14 above the swivel 16. It may be rotated by any conventional means, e.g., an electric motor (not shown). Power lever 52 is pivoted to the supply pipe 14 above the swivel 16. Power cable 48 is connected to the lever 52. Pitman 54 connects the wheel 50 to the lever 52 as illustrated. Rotation of the wheel 50 by the motor (not shown) will reciprocate the power cable 48. The means for reciprocating the cable 48, illustrated and described above, is only exemplary and numerous methods may be used to reciprocate the cable 48 all of which would be within the capabilities of ordinary mechanics.

Figure 3:
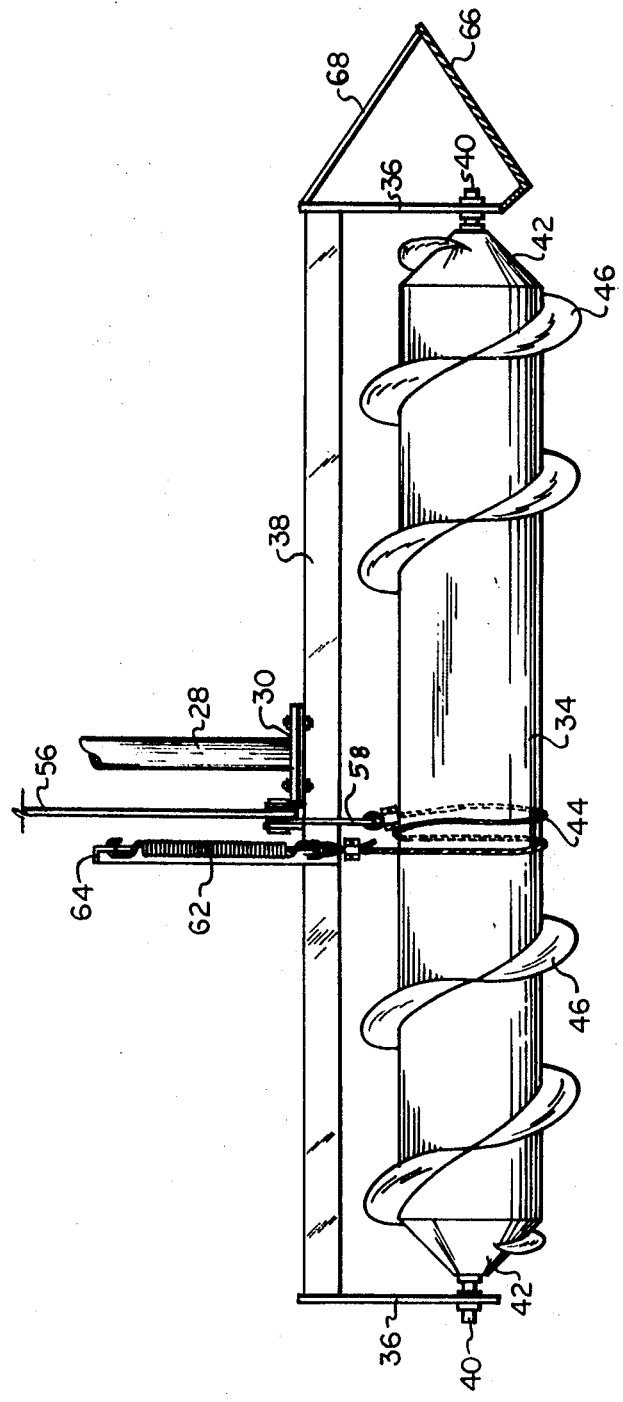
FIG. 3 is a side elevational view of one ground engaging element according to this invention.

At each vehicle, arm 56 is pivoted to the beam 38 by ears welded to the beam 38 (FIGS. 2 and 3). The upper end of the arm 56 is secured to the power cable 48. The arm 56 is bent and the lower arm is horizontally disposed at 58 and has plurality of holes 60 therethrough. The band 44 in the form of a winding cable has one end secured through one of the holes 60. The band 44 encircles the cylindrical element 34 completely once and is attached at the other side to spring 62 which extends to spring holder 64 which is attached as by welding to the beam 38.

It may be seen that the band 44, in the form of a winding cable because it winds around the element 34, actually extends 1 ½ times around the cylindrical element 34. In which of the several holes 60 the band 44 is connected depends upon the distance of that particular vehicle 18 from the pivot supply pipe 14. If the vehicle 18 is adjacent to the pivot supply pipe 14, it will be necessary for the vehicle to travel only a very short distance and therefore the band 44 may be attached into a hole 60 which is quite close to the point where the arm 56 is pivoted to the vehicle. On the other hand if the vehicle is far removed from the pivot supply pipe 14, then the band 44 would be connected into a hole 60 far removed from the pivot point of the arm 56 so that the winding band 44 would be moved a greater amount thus causing the vehicle 18 to move a greater amount.

In operation, the power cable 48 is reciprocated by the action of arm 52 as described above and retracted by a spring which is within the skill of the art and is therefore not illustrated. The reciprocation of the cable 48 oscillates the arm 56 which causes the winding cable 44 to rotate the element 34. The band in the form of winding cable 44 upon the element 34 operates quite similar to a capstan and it translates oscillating motion of arm 56 into rotation of single direction of element 34. The helical vane 46 on the element causes the element to "auger" itself along the ground moving the system forward. Over rough terrain if the nose or the forward point 42 of the element 34 buries itself in the earth, it will act as an "auger" and tend to drill into the earth. Shoe 66 is mounted by a suitable bracket 68 upon the forward portion of the bracket formed by the beam 38 and ears 36 to prevent this occurrence.

Figure 4:
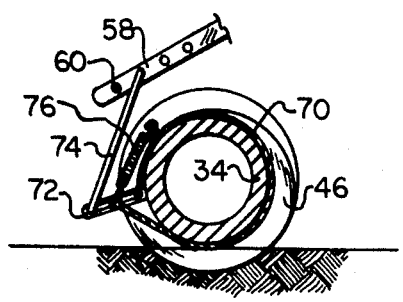
FIG. 4 is a partial sectional view showing a modified means for turning the ground engaging element, taken from a position similar to that position for FIG. 2.

FIG. 4 illustrates a different embodiment for rotating the cylindrical element 34 responsive to oscillation of the lower portion 58 of the arm 56. As before, the element 34 would have a helical vane 46 to auger the vehicle along the ground. In this instance the winding band 70 encircling the element 34 is more in the form of a band than a cable. One end of the band 70 is attached to one end of operating lever 72 and the other end is attached to the midpoint of the lever 72. The outboard end of the lever 72 is connected by rod 74 to one of the holes 60 within the horizontal bottom portion 58 of operating arm 56. The spring 76 extends from the midpoint of lever 72 to the band 70 as illustrated. Skilled mechanics will recognize the mechanism as being similar to a brake band. In operation when the lever 58 is oscillated in an upward direction so that it tensions rod 74, the band 70 is tightened and the element 34 is rotated with the movement of the rod 74. When the lever 58 is oscillated to compress the rod 74, the lever 72 releases the tension from the band 70 so band 70 is free to slip around the element 34. Therefore oscillation of the arm 56 is transposed into rotation in a single direction of the element 34.

FOr the purposes of explanation of this invention, I have merely shown and described how the elements move the sprinkler pipe 10. I have described it as a pipe moving in a circle although it will be understood by those skilled in the art that it would be equally advantageous in moving a pipe in a straight line if such a system were developed. I have not attempted to show all the various and sundry elements that would go to make up a complete system. E.g., I have not shown an alignment system which would be necessary. However, alignment systems of various types are available such as shown in my prior U.S. Pat. No. 3,302,656 or the copending joint application with R. J. Purtell mentioned above.

It is necessary of course for the proper operation of this system that the elements 34 not roll along the ground, but that the vanes 46 cut into the ground and that the ground engaging elements 34 rotate with respect to the ground and slide along the ground. The sliding action of the element 34 scours the mud from the element. All of these conditions and modes of operation indicate that this system works as well in the mud as it does on dry ground.

This particular condition indicates that each of the vehicles do tend to have a certain sideway movement or pull. However, this in itself is something of an advantage because in the system as described it is desirable that the pipe have tension in it and, therefore, that the elements are all set to rotate in such a direction that they pull the vehicles 18 away from the pivot pipe 14.

Such a system emphasizes the need to provide proper bracing between the vehicles 18 and the pipe 10.

Figure 7:
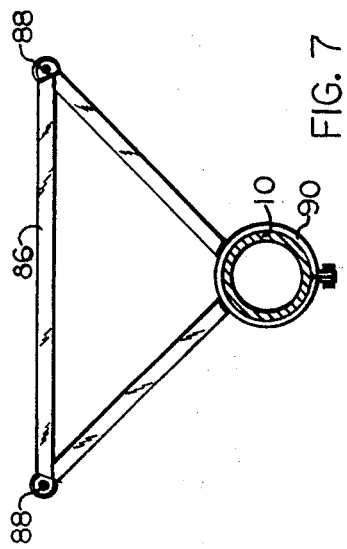
FIG. 7 is a detail of a spreader taken substantially on line 7—7 of FIG. 5.
Figure 6:
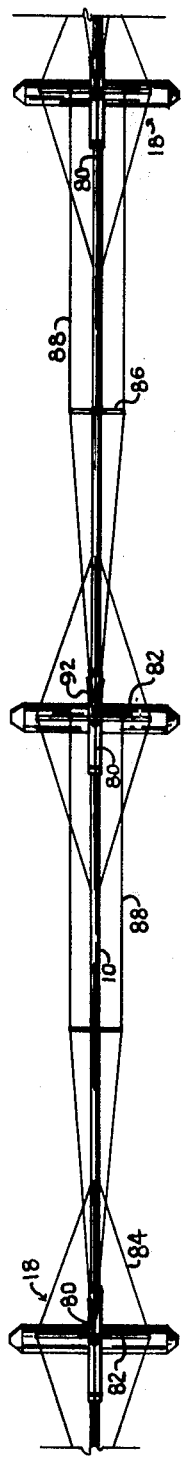
FIG. 6 is a plan view similar to FIG. 5 showing the bracing and supports.
Figure 5:
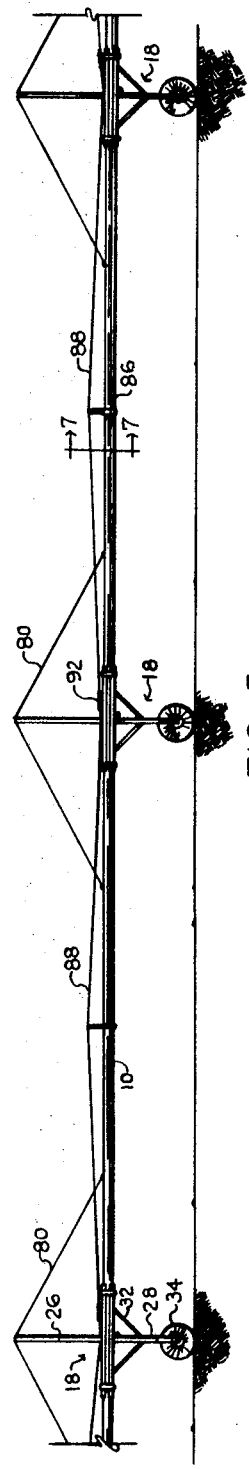
FIG. 5 is a front elevational view, somewhat schematic, showing the support of the pipe and bracing the units.

Referring in particular to FIGS. 5 and 6, the supporting and bracing details are seen. The vehicles 18 are spaced at long intervals along the pipe 10 for economy and the pipe is supported by guy wires 80 extending from the top of the mast 26 to the pipe 10 between vehicles. These guy wires and the bracing is not shown in FIGS. 1–4 for better illustration of the propulsion means of the vehicle and likewise the details of the propulsion of the vehicle are not shown in FIGS. 5–7.

Each of the vehicles also include horizontal stabilizers 82 attached as by welding at the top of the stanchion 28. The stabilizers 82 are made rigid at right angles by braces 84 extending from the ends of the stabilizers to the ends of the saddles 20. With saddles 20 extending along the pipe 10 together with the braces 32 and the stabilizers 82 with their braces 84 and the guy wires 80, the pipe 10 is supported to the vehicle 18 so that the pipe adjacent to the vehicle will tilt or act as a single unit with the vehicle. However, the pipe 10 itself is flexible, particularly in the long reaches between vehicles. The pipe will bend between vehicles. This is necessary because the system will be approximately 1,300 feet long and, in general, the terrain over which it operates will not be level for this length and, therefore, it is necessary for the system to undulate or bend to cross little valleys or hills from one end of the system to the other. Also, it is desirable for the pipe 10 to have as high clearance above the ground as possible to pass over the tops of growing crops, and, therefore, it is undesirable to have any sort of bracing or supports under the pipe except at the vehicles 18.

The pipe and the vehicle tilt as a unit and therefore if the pipe is prevented from rising on one side, it will not bend down on the other. To accomplish this, spreader or strut 86 is placed about midway between vehicles (FIGS. 5, 6, and 7) and holddown wire or stay 88 is extended from one vehicle over the spreader 86 and to the adjacent vehicle 18. The spreader 86 extends above the pipe 10 and to either side of the pipe in triangular configuration and is attached to the pipe by clamp 90. The holddown stay may be attached to the vehicle 18 itself or to the pipe 10 closely adjacent to the vehicle and still perform its function preventing the pipe 10 from rising between vehicles. Thus with the stay 88 over the spreader or strut 86 which is above the pipe 10 and attached to the pipe at the vehicle, the stay is higher at the strut 86 than at the connection of the pipe. Also, to provide flexibility, spring 92 is placed within each of the holddown wires 88 to provide sufficient resilience so that the system has the flexibility necessary to accommodate uneven terrain over which it operates.

According to present experience, the preferred mode is to connect the springs 92 to the vehicle at the pipe at one vehicle 10 and connect the holddown stay 88 to the other end of the spring 92 and extend the holddown stay over the corners of the spreader 86 and attach the other end of the holddown wire 88 to the end of the stabilizer 82 at the adjacent vehicle. This is shown in FIGS. 5 and 6. In this manner the holddown stays 88 stabilize the pipe 10 between vehicles 18 while the pipe is primarily supported between vehicles by guys 80.

The embodiments shown and described above are only exemplary. I do not claim to have invented all the parts or elements described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:
1. In an irrigation system having
   a. a horizontal elongated pipe connected to
   b. a source of water under pressure adapted to carry
   c. a plurality of sprinklers for sprinkling water upon the ground, and
   d. a plurality of vehicles for movingly supporting the pipe above the ground;
   e. the improvement in said vehicles comprising in combination with the above:
   f. a cylindrical ground engaging element having
   g. helical vanes thereon,
   h. said cylindrical element journaled to said vehicle for rotation about its axis,
   j. the axis of said cylindrical element being horizontal and normal to said pipe, and
   k. means drivingly connected to said cylindrical element for rotating it about its axis.
2. The invention as defined in claim 1 with the additional limitation of said means for rotating including:
   m. a winding cable encircling said cylinder;
   n. means attached to one end thereof for reciprocating the cable, and
   o. a spring attached to the other end of the cable.
3. The invention as defined in claim 1 with the additional limitation of
   m. said pipe anchored at one end of said source of water, and
   n. said cylindrical elements are rotated in a direction which tends to pull the pipe away from said source.
4. The invention as defined in claim 1 with the additional limitation of said means for rotating including:
   m. a band encircling the cylinder,
   n. means attached to one end of the band for reciprocating the band, and
   o. means attached to the other end of the band
      i. for tightening the band in one direction of reciprocation so that it grips the cylindrical element to rotate it and
      ii. for loosening the band in the other direction of reciprocation so that the band slips around the cylinder.
5. The invention as defined in claim 4 with the additional limitation of said means for reciprocating including:
   p. a power cable extending along the pipe,
   q. means for reciprocating the power cable, and
   r. a crank pivoted to the vehicle connected to
      i. the power cable and
      ii. the band.
6. The invention as defined in claim 1 with the additional limitation of
   m. a spreader attached to said pipe between vehicles,
   n. said spreader extending above the pipe,
   o. a stay extending over the spreader and connected to the pipe at a point nearer the vehicle than the spreader, and
   p. resilient means associated with said stay to permit the pipe to flex as the system moves over an irregularity in said land.
7. The invention as defined in claim 6 with the additional limitation of
   q. said spreader extending upward and to either side of said pipe,
   r. two stays extending over the spreader,
   s. each stay being attached to the spreader above and to either side of the pipe so as to give additional stability to the system.